Patented Mar. 28, 1933

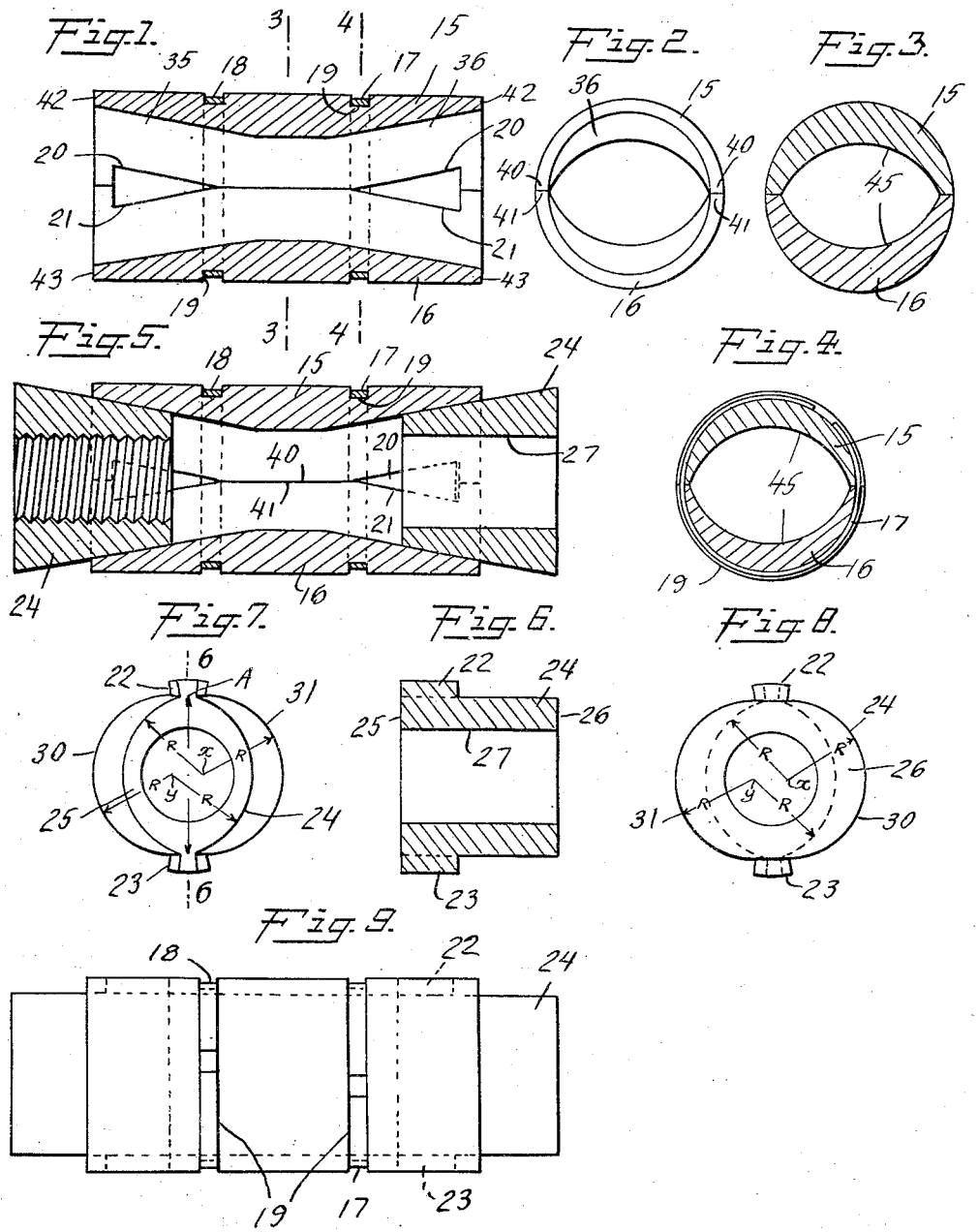

1,903,241

UNITED STATES PATENT OFFICE

ROY E. McINTOSH, OF NEW YORK, N. Y., ASSIGNOR TO J. EDWARD OGDEN COMPANY, INC., OF EAST ORANGE, NEW JERSEY, A CORPORATION OF NEW JERSEY

EXPANSION SHIELD

Application filed October 7, 1930. Serial No. 486,920.

This invention relates to expansion shields adapted to form anchorages in walls of brick, stone or cementitious material not adapted to directly receive and retain a threaded element or bolt.

This invention relates more particularly to a double ended expansion shield and has for its salient object to provide a shield and a nut or expanding element so constructed and arranged that the nut or nuts will accurately fit within and bear against the inner surfaces of the shield in all positions of engagement between the nut and shield.

Further objects of the invention will appear from the following specification taken in connection with the drawing, which forms a part of this application, and in which Fig. 1 is a longitudinal sectional elevation of a shield constructed in accordance with the invention;

Fig. 2 is an end elevation of one end of the shield shown in Fig. 1;

Figs. 3 and 4 are transverse sectional elevations taken substantially on lines 3—3 and 4—4 of Fig. 1;

Fig. 5 is a longitudinal sectional elevation of the shield and expanding elements shown in Fig. 1;

Fig. 6 is a sectional elevation of the expanding element or nut;

Figs. 7 and 8 are end elevations of the nut shown in Fig. 6; and

Fig. 9 is an elevational view of the shield and expanding elements or nuts.

The invention briefly described consists of an expansion shield comprising a pair of sections having tapered or inclined portions at the ends thereof adapted to receive correspondingly tapered or inclined expanding elements or nuts. The nuts and the surfaces engaged thereby are so shaped that the nuts and shield portions engaged thereby will have surface contact in all positions of the expanding elements or nuts. As a matter of fact, the two ends of the nuts are oval in shape and the major axis at the small end of the nut is substantially equal to the minor axis at the large end of the nut, thus providing a construction in which the outer peripheries of the nut taken through one plane are parallel, whereas, the peripheries taken through a plane at right angles to said plane are tapered. The surfaces of the shield engaged by the nut are correspondingly formed and the shield is expanded by the nuts in two directions only.

Further details of the invention will appear from the following description.

In the particular form of the invention illustrated in the drawing, the expansion shield comprises a pair of sections 15 and 16 which are shown as formed of cast metal and are normally retained against separation by a pair of split rings 17 and 18 which encircle the sections and are disposed in annular grooves 19.

The shield sections are provided with oppositely extending notches 20 and 21 adjacent the ends thereof which are adapted to receive and confine laterally extending V-shaped lugs 22 and 23 formed on the expanding elements or nuts 24 at diametrically opposite points thereof.

The nuts 24, as shown in Figs. 7 and 8 are oval shaped at the two ends 25 and 26. It will be noted from the showing in Fig. 7 that the major axis A, B of the smaller end of the expanding element or nut 24 is substantially equal to the minor axis at the larger end 26 of the nut. This is also illustrated by the showing in Fig. 6 which is taken substantially on line 6—6 of Fig. 7. In Fig. 6 the outer edges of the nut are shown as substantially parallel. The inner surface of the nut, as shown at 27, is substantially cylindrical.

The oval surface at the large end 26 of the shield is formed principally by curved portions 30 and 31 which are semi-circular in curvature. The tapered surfaces 30 and 31 constitute portions of cylinders and lie in cylinders having their axes inclined to each other and intersecting on the longitudinal axis of the nut. The radius of a section of the cylinders is indicated as R and the centers of curvature are indicated at X and Y. These centers shift from X to Y or vice versa, from one end of the nut to the other end, as shown in Figs. 7 and 8. The tapered surfaces 35 and 36 which are formed at the two ends of the expansion shield are curved on arcs corresponding to the curvature of the nuts and the nuts, therefore, have surface contact with the portions 35 and 36 in all positions of the nuts therein. From the showing in Figs. 1 and 5 it will be noted that the edges of the notches 20 and 21 are substantially parallel to the lines of taper of the inner surfaces of the shield sections. Furthermore, the outer edges of the lugs 22 and 23 are also correspondingly inclined.

The longitudinal edges 40 and 41 of the shield sections are substantially uniform in width and the ends 42 and 43 of the sections are of substantially the same width as the edges. Between the edges, however, the shield sections are crescent shaped, as shown at 45 in Figs. 3 and 4.

One of the expanding elements is threaded, as shown at the left in Fig. 5, and the opening in the other element is sufficiently large to permit a bolt, that is threaded to fit the nut thread, to pass therethrough.

When the shield has been placed in a wall opening it is expanded by drawing the two nuts toward each other, thus causing the shield sections to be forced laterally in a direction at right angles to the taper of the nuts. By forming the nuts and the surfaces of the shield in the manner described, a two way expansion is assured and the interfitting surfaces as well as the engagement between the lugs on the nuts and the notches in the shield prevent any relative rotational movement between the nut and the shield.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. An expansion shield comprising a pair of sections having outer surfaces forming a substantially cylindrical outer surface for the shell, the edges of the sections along the lines of cleavage being substantially uniform in thickness, said sections having tapered end portions crescent shaped in transverse sections, and expanding elements disposed within said tapered portions.

2. An expansion shield comprising a pair of sections having outer surfaces forming a substantially cylindrical outer surface for the shell, the edges of the sections along the lines of cleavage being substantially uniform in thickness, said sections having tapered end portions, the transverse sections of which are thicker intermediate said edges than at the edges, and expanding elements disposed within said tapered portions.

3. An expansion shield comprising a pair of sections having outer surfaces forming a substantially cylindrical outer surface for the shell, the edges of the sections along the lines of cleavage being substantially uniform in thickness, said sections having tapered end portions, crescent shaped in transverse section, the end edges thereof being of substantially the same thickness as the side edges, and expanding elements disposed within said tapered portions.

4. An expansion shield comprising a pair of sections having outer surfaces forming a substantially cylindrical outer surface for the shell, the edges of the sections along the lines of cleavage being substantially uniform in thickness, said sections having tapered end portions, the transverse sections of which are thicker intermediate said edges than at the edges, the end edges of said portions being of substantially the same thickness as the side edges, and expanding elements disposed within said tapered portions.

5. An expansion shield comprising a pair of sections and a pair of expanding elements longitudinally movable therein, each of said elements having an outer surface with opposite portions tapered in one plane and other opposite portions parallel to each other, said sections having inner surfaces, corresponding in shape and taper to the outer surfaces of the respective expanding elements, and fully contacting therewith in all positions of engagement of the expanding elements with said shield.

6. An expansion shield comprising a pair of sections and a pair of expanding elements longitudinally movable therein, each of said elements being less than half the length of said sections and having an outer surface with opposite portions tapered in one plane and other opposite portions parallel to each other, said sections having inner surfaces, less than half the length of said sections and corresponding in shape and taper to the outer surfaces of the respective expanding elements, and fully contacting therewith in all positions of engagement of the expanding elements with said shield, each of said sections being substantially crescent shaped in transverse sections through the tapered portions thereof.

7. An expansion shield comprising a pair of sections and a pair of expanding elements longitudinally movable therein, each of said elements being less than half the length of said sections and having an outer surface with opposite portions tapered in one plane and other opposite portions parallel to each other, the edges of said sections along the lines of cleavage being substantially uniform in thickness, said sections having tapered end portions substantially crescent shaped in transverse section, the end edges thereof being of substantially the same thickness as the side edges, the inner surface of said tapered end portions being less than half the length of the sections and corresponding in shape to the outer surfaces of the respective expanding elements, and fully contacting therewith in all positions of engagement of the expanding elements with said shield.

ROY E. McINTOSH.